US008761188B1

(12) United States Patent
Krikelis et al.

(10) Patent No.: US 8,761,188 B1
(45) Date of Patent: *Jun. 24, 2014

(54) MULTI-THREADED SOFTWARE-PROGRAMMABLE FRAMEWORK FOR HIGH-PERFORMANCE SCALABLE AND MODULAR DATAPATH DESIGNS

(75) Inventors: Anargyros Krikelis, Farnham (GB); Martin Roberts, Marlow (GB)

(73) Assignee: Altera Corporation, San Jose, CA (US)

( * ) Notice: Subject to any disclaimer, the term of this patent is extended or adjusted under 35 U.S.C. 154(b) by 975 days.

This patent is subject to a terminal disclaimer.

(21) Appl. No.: 12/150,889

(22) Filed: Apr. 30, 2008

Related U.S. Application Data

(60) Provisional application No. 60/915,205, filed on May 1, 2007.

(51) Int. Cl.
*G06F 15/76* (2006.01)
(52) U.S. Cl.
USPC .............. 370/412; 712/16; 712/34; 712/35; 712/37
(58) Field of Classification Search
CPC ............................... H04L 45/00; H04L 49/00
USPC ....................... 370/412; 726/16, 34, 35, 37
See application file for complete search history.

(56) References Cited

U.S. PATENT DOCUMENTS

| 6,794,896 | B1* | 9/2004 | Brebner | 326/38 |
|---|---|---|---|---|
| 7,007,101 | B1* | 2/2006 | Schwaderer | 709/238 |
| 7,301,822 | B1* | 11/2007 | Walstrum et al. | 365/189.011 |
| 7,461,236 | B1* | 12/2008 | Wentzlaff | 712/10 |
| 7,746,862 | B1* | 6/2010 | Zuk et al. | 370/392 |
| 2002/0064154 | A1* | 5/2002 | Sharma et al. | 370/357 |
| 2002/0097679 | A1* | 7/2002 | Berenbaum | 370/232 |
| 2003/0172249 | A1* | 9/2003 | Ganapathy et al. | 712/35 |
| 2004/0049613 | A1* | 3/2004 | Kim et al. | 710/52 |
| 2004/0158573 | A1* | 8/2004 | Bradley et al. | 707/102 |
| 2005/0249185 | A1* | 11/2005 | Poor et al. | 370/349 |
| 2006/0179156 | A1* | 8/2006 | Eatherton et al. | 709/238 |
| 2006/0290776 | A1* | 12/2006 | Rutten et al. | 348/14.09 |
| 2007/0053356 | A1* | 3/2007 | Konda | 370/390 |

OTHER PUBLICATIONS

Hauser, J. R. and Wawrzynek, J. (1997). Garp: A MIPS processor with a reconfigurable coprocessor. In Pocek, K. L. and Arnold, J., editors, IEEE Symposium on FPGAs for Custom Computing Machines, pp. 12-21, Los Alamitos, CA. IEEE Computer Society Press.*
A Pattern-Matching Co-Processor for Network Intrusion Detection Sytems, C. Clark and D. Schimmel, Proceedings of IEEE International Conference on Field-Programmable Technology (FPT), Dec. 2003.*

* cited by examiner

*Primary Examiner* — Ayaz R. Sheikh
*Assistant Examiner* — Tarell Hampton
(74) *Attorney, Agent, or Firm* — Ropes & Gray LLP; Jeffrey H. Ingerman

(57) ABSTRACT

In the provided architecture, one or more multi-threaded processors may be combined with hardware blocks. The resulting combination allows for data packets to undergo a processing sequence having the flexibility of software programmability with the high-performance of dedicated hardware. For example, a multi-threaded processor can control the high-level tasks of a processing sequence, while the computationally intensive events (e.g., signal processing filters, matrix operations, etc.) are handled by dedicated hardware blocks.

33 Claims, 9 Drawing Sheets

MULTI-THREADED SOFTWARE-PROGRAMMABLE FRAMEWORK FOR HIGH-PERFORMANCE SCALABLE AND MODULAR DATAPATH DESIGNS

CROSS REFERENCE TO RELATED APPLICATION

This claims the benefit of U.S. Provisional Patent Application No. 60/915,205, filed May 1, 2007, which is hereby incorporated by reference herein in its entirety.

BACKGROUND OF THE INVENTION

The present invention relates to datapath processing. In one embodiment, the present invention relates to apparatus and methods for high-performance, datapath processing. The present invention is particularly useful for programmable logic devices (PLDs).

Many modern processing applications (e.g., packet processing, digital signal processing, digital image processing) require both high-performance and high flexibility. Existing processing devices, however, typically provide inflexible pipeline architectures that have several shortcomings. For example, pipelined processing devices are limited in their speed. To guarantee that each stage executes properly, a pipelined device can only operate as fast as the slowest stage of the pipeline. Moreover, such pipelines typically operate in a sequential manner, whereby each unit of data must pass through each stage of the pipeline regardless of processing variables (e.g., the type of data or the mode of operation). Such inflexibility can cause inefficiencies and delays. It would therefore be desirable to provide a high-performance and flexible data processing apparatus.

SUMMARY OF THE INVENTION

The present invention provides improved apparatus, systems, and methods for processing data packets. It is to be noted that while the term "packet" can be used to refer to units of data in a computer network, it is to be interpreted herein as meaning any unit of data that can be processed. The term "packet information" as used herein may mean any portion of a packet which may be indicative of a packet's characteristics (e.g., type, status, origin, destination, beginning, end). "Packet information" can include, for example, any portion of a packet's header, including the entire header. In addition, "packet information" may include all or a portion of a packet's payload. In some embodiments with suitably sized packets, "packet information" can include a whole packet.

In the provided architecture, one or more multi-threaded processors may be combined with hardware blocks. The resulting combination allows for data packets to undergo a processing sequence having the flexibility of software programmability with the high-performance of dedicated hardware. For example, a multi-threaded processor can control the high-level tasks of a processing sequence, while the computationally intensive events (e.g., signal processing filters, matrix operations, etc.) are handled by dedicated hardware blocks.

A data packet's processing sequence may be controlled by a software program running on the one or more multi-threaded processors. The software program can include instructions for packet information associated with the packet to undergo processor tasks performed by one of the one or more processors in addition to various interspersed instructions for hardware events, each of which is performed by a hardware block on the packet information or some or all of the associated packet. To coordinate the transfer of packet information between tasks occurring in one of the one or more processors and events occurring in hardware blocks, interface circuitry may be provided.

Interface circuitry may include an input controller having an input queue (e.g., FIFO memory) and scheduling circuitry. When a hardware block has completed a hardware event in the processing sequence of a packet, an input controller can load one or more pointers into the input queue. The pointers can represent information about the data packet, such as the memory address of the packet or a portion thereof (e.g., packet information) and the next task in that packet's processing sequence, among other things. The input queue can store these pointers while waiting for an idle thread in one of the one or more processors (e.g., an available thread that is not executing any instructions). Scheduling circuitry can identify when threads become idle and can read the set of pointers from the front of the input queue. Scheduling circuitry can transfer the packet information associated with that set of pointers to the idle thread and can instruct the processor to execute the newly loaded thread beginning at a particular instruction in the processor's program. The instruction where the program begins may be derived from one of the pointers in the set at the front of the input queue.

Interface circuitry may also include an output controller that transfers packet information from one of the one or more processors to an event block. The program running on the one or more processors can include instructions to perform a hardware event on packet information or some or all of the associated packet. The instructions may also include parameters that are to be used when performing that hardware event. When a processor encounters such an instruction, it can generate a pointer that designates the next event in the packet's processing sequence. The processor can also generate additional pointers, such as pointers designating the parameters for the hardware event, for example. These pointers can be incorporated into the set of pointers previously assigned to the packet information (see previous discussion of pointer sets), and the new set can be loaded into an output queue that is part of the output controller. The output controller can access the set of pointers from the queue and transfer the corresponding packet information to the specified hardware block. In an alternative embodiment, the parameters of a hardware event can be passed to the event by a configuration bus.

In accordance with the present invention, order enforcement may be optionally provided if it is appropriate for the application (e.g., when processing communications signals). Order enforcement can be used to ensure that each instance of packet information leaves the output controller in the same order as it was received by the input controller. Additionally or alternatively, order enforcement can be applied at a higher level to ensure that packets leave the processing apparatus in the same order as they entered it. The input controller, the output controller, and/or one or more hardware blocks can be used to implement order enforcement.

In accordance with the present invention, any portion of the provided data processing apparatus can be provided on a programmable integrated circuit device such as a programmable logic device (PLD).

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

As described above, according to the present invention a data processing apparatus can combine the flexibility of software programmability with the high-performance of dedicated hardware in a scalable architecture.

The invention will now be described with reference to FIGS. 1-9.

Figure 1:
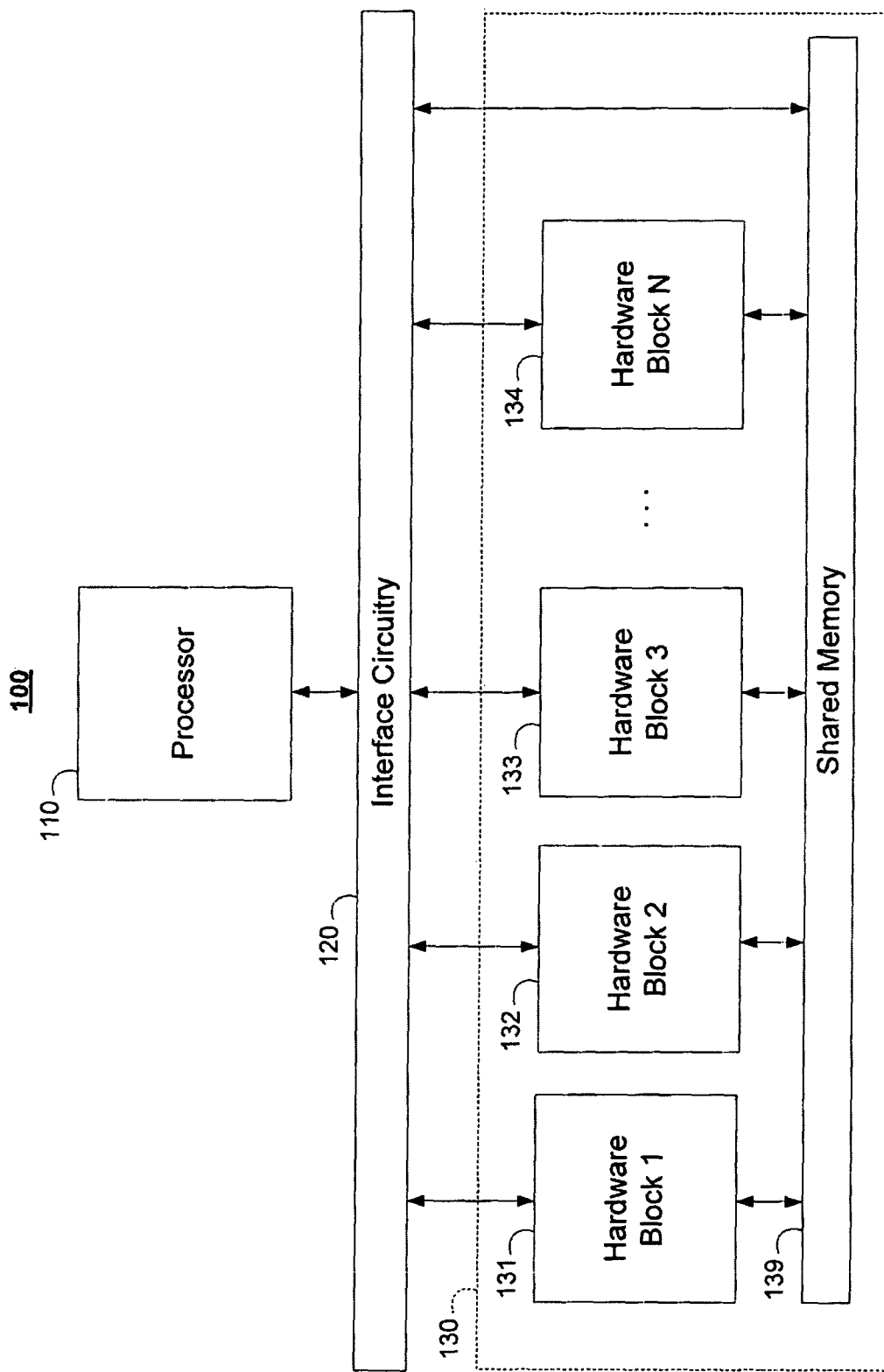
FIG. 1 is a simplified block diagram of a data processing apparatus in accordance with the present invention.

FIG. 1 shows a data processing apparatus 100 in accordance with the present invention. Apparatus 100 can include processor 110, interface circuitry 120, and hardware blocks 130. Apparatus 100 can process successive data packets concurrently, meaning that apparatus 100 can begin processing subsequent packets before it has finished processing an earlier packet. At any given time, apparatus 100 may be processing a plurality of packets and each packet may be at a different stage in the processing sequence.

Processor 110 can be any logic, mechanism, or device that supports an instruction set. Processor 110 can support a complex instruction set computing (CISC) instruction set, a reduced instruction set computing (RISC) instruction set, or any of a variety of other instruction sets. Processor 110 can be loaded with a software program that controls the processing sequence of data packets. The software program can include instructions for the processor to execute as well as instructions for events that occur in hardware blocks. A detailed discussion about software programs for processor 110 in accordance with the present invention can be found below in connection with FIG. 2.

In accordance with the present invention, processor 110 is a multithreaded processor that is configured to support a number of threads using context switching. In one embodiment, processor 110 can process each thread for a single clock cycle before context switching to process a next thread (e.g., time-slicing). A detailed description of multithreaded processors can be found in copending, commonly-assigned U.S. patent application Ser. No. 10/728,032, filed Dec. 3, 2003, which is hereby incorporated by reference herein in its entirety.

Interface circuitry 120 can facilitate the transfer of packet information between processor 110 and hardware blocks 130. Interface circuitry 120 can include an input controller (not shown) to ensure that packet information is not sent to processor 110 when the processor is busy. Interface circuitry 120 can also include an input controller (not shown) to control the transfer of packet information to processor 110 and an output controller (not shown) to control the transfer of packet information to hardware blocks 130. Interface circuitry 120 can also selectively delay the transfer of packet information. For example, if later packet information takes less time to process than earlier packet information, interface circuitry 120 may delay the later packet information to preserve the order in which packets are processed (e.g., order enforcement). An exemplary embodiment of interface circuitry 120 is discussed below in connection with FIG. 4.

Hardware blocks 130 can be used to perform hardware events on packet information or some or all of the associated packet. Various portions of a packet processing sequence can be implemented through hardware events. It may be advantageous to design a processing sequence such that the computationally intensive portions of the sequence are performed as hardware events. For example, packet processing sequences may use multiple look-up operations and complicated signal processing operations, such as Fast Fourier Transforms (FFTs) and finite-impulse response (FIR) filters, both of which can be implemented as hardware events. Using dedicated hardware blocks to perform these portions of a processing sequence can be much quicker than performing the same operations using instructions running on a processor.

In accordance with the present invention, hardware blocks 130 can include any number of hardware blocks (e.g., hardware block 131, hardware block 132, hardware block 133, and hardware block 134). Hardware blocks 130 can include any combination of logic gates and memory. In some embodiments, hardware blocks 130 may include an interface to external memory devices. The configuration of each hardware block can be specialized for the hardware event that it performs.

Although hardware blocks 130 may be designed to perform a certain type of hardware event on packet information or some or all of the associated packet, the hardware blocks can be configurable such that the event is tailored to that particular situation. For example, hardware blocks 130 can accept parameters that further define the hardware event to be performed on packet information or some or all of the associated packet. Parameters used to configure a hardware block may, for example, be the result of a previous task completed by processor 110. Parameters can be transmitted to hardware blocks 130 through a configuration bus (not shown) that is connected to each of the hardware blocks in addition to processor 110. Hardware blocks 130 can be configured with default parameters such that a default set of parameters is used if no parameters are provided. Alternatively, hardware blocks 130 may be configured to not accept any parameters.

Hardware blocks 130 can include an input hardware block 131 and an output hardware block 134. Input hardware block 131 can be coupled to the input of apparatus 100 such that any packet information corresponding to new data packets first passes through block 131. Input hardware block 131 can be configured to perform a hardware event that prepares packet information for the processing sequence of apparatus 100. For example, block 131 can assign a packet information pointer to data packets. This packet information pointer can be selected from the front of a queue such that sequential instances of packet information are assigned sequential pointers and the pointers can be used to identify the order in which the associated packets are received. Such packet information pointers may be used later to reorder the instances of packet information in a form of order enforcement. Additionally or alternatively, input hardware block 131 can format packet information or some or all of an associated packet to prepare it for processing.

Output hardware block 134 can be coupled to the output of apparatus 100. The hardware event performed by output block 134 may be the last instruction in the software program running on processor 110 such that block 134 is the last portion of each packet's processing sequence. Output block 134 can, for example, remove all pointers from packet information or an associated data packet. In one embodiment, output block 134 can reorder packet information such that the associated packets are output from apparatus 100 in the same order as they are received (e.g., order enforcement).

Hardware blocks 130 can also include shared memory 139 for storing packet information or data packets. Shared memory 139 can be used to store packet information or data packets during portions of the processing sequence involving hardware events. For example, shared memory 139 can be coupled to each hardware block such that each hardware block can access packet information or data packets stored therein and perform hardware events on them. In one embodiment, a hardware block may be sent a pointer corresponding to an address in shared memory 139 such that the block can access packet information or some or all of the associated packet stored at that address and perform a hardware event on that packet information or some or all of the associated packet.

It is to be understood that, in a data processing apparatus in accordance with the present invention, one or more processors (e.g., processor 110) can operate at a clock frequency that is different from the clock frequency that hardware blocks (e.g., hardware blocks 130) operate at. For example, processor 110 can operate at a higher frequency than hardware blocks 130. To account for the difference in frequencies, interface circuitry (e.g., interface circuitry 120) can operate at both frequencies by including some elements that operate at the frequency of the one or more processors and other elements that operate at the frequency of the hardware blocks.

It is to be further understood that any portion of a data processing apparatus (e.g., processor 110, interface circuitry 120, or hardware blocks 130) can be incorporated into a programmable logic device (PLD) in accordance with the present invention.

Figure 2:
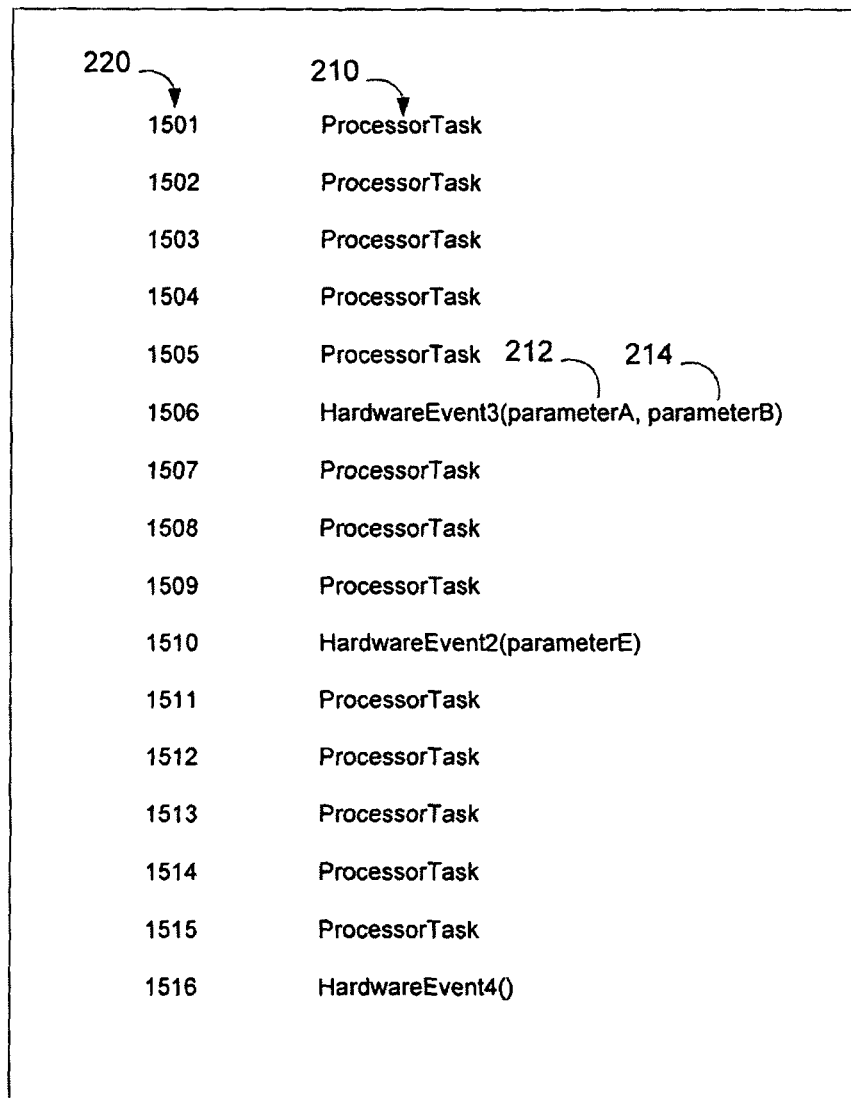
FIG. 2 is a simplified software program in accordance with the present invention.

FIG. 2 shows a simplified software program 200 for processing data packets in accordance with the present invention. Software program 200 can be loaded into the memory of the one or more processors of a data processing apparatus (e.g., processor 110). Software program 200 can include instructions 210, each of which can be assigned one of addresses 220. Addresses 220 can represent where the corresponding instruction is stored in memory and can be used to identify instructions in software program 200. For example, packet information can be sent from a hardware block to a processor along with a task pointer referencing the next processor task (e.g., one or more software program instructions) in the processing sequence. Addresses 220 shown in FIG. 2 are merely exemplary and a person of ordinary skill in the art will appreciate that different forms of memory addresses can be used without deviating from the spirit of the present invention.

Program 200 can include instructions that correspond to processor tasks in a processing sequence (e.g., instructions stored at addresses 1501-1505, 1507-1509, and 1511-1515). The processor that is running program 200 may internally perform each of these instructions on packet information.

Program 200 can also include instructions corresponding to events in a processing sequence, each of which is performed by a hardware block (e.g., hardware block 131, 132, 133, or 134). Instructions corresponding to hardware events (e.g., instructions stored at addresses 1506, 1510, and 1516) can include a reference to the hardware block for performing the corresponding event, one or more packet information pointers corresponding to any packet information that must be transferred from the processor to external memory (e.g., shared memory 139), and information regarding how to handle order enforcement for this event. Instructions for hardware events can be passed parameters (e.g., parameters 212 and 214) defining how a hardware event is to be performed. Such parameters can be used to configure the hardware event's respective hardware block. For example, parameterA 212 and parameterB 214 can be used to configure hardware block 3. The last instruction (e.g., the instruction at address 1516) may correspond to an output hardware block (e.g., hardware block 124) such that this instruction is executed when the data packet's processing sequences is finished.

Figure 3:
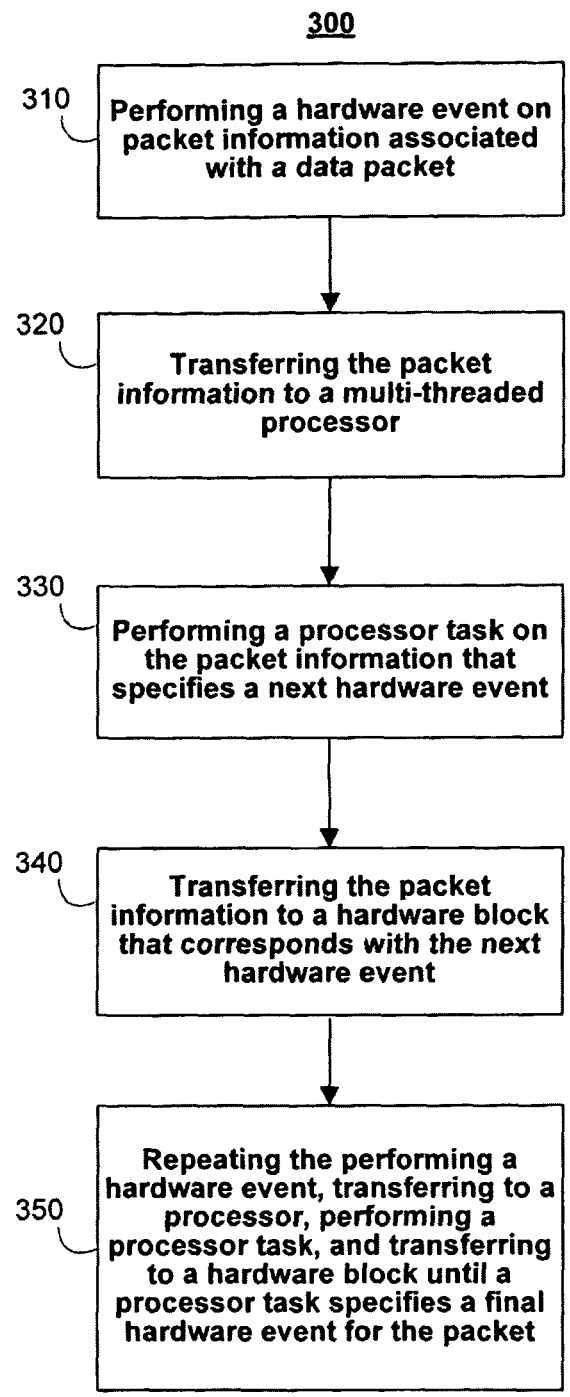
FIG. 3 is a flowchart of a data processing method in accordance with the present invention.

FIG. 3 shows a flowchart of method 300 for processing a data packet in accordance with the present invention. At step 310, a hardware event can be performed on packet information associated with a data packet. The hardware event can be performed by a hardware block (e.g., one of blocks 130). For example, if an event is the first hardware event in a processing sequence, the event may be performed by an input hardware block (e.g., input hardware block 131). In some embodiments, at step 310, a hardware event can be performed not only on packet information, but also on some or all of the associated data packet. At step 320, the packet information can be transferred to a multi-threaded processor (e.g., processor 110). Packet information can be transferred to a multi-threaded processor using interface circuitry or, more specifically, an input controller. When packet information is transferred to a processor, a task pointer may be used to identify the address of the next processor task (e.g., one or more software instructions) in the associated packet's processing sequence. At step 330, a processor task can be performed on the packet information. The processor task can include one or more instructions in a software program. The processor, task may specify a next hardware event, for example, by identifying the corresponding hardware block. The process task may also specify a configuration for the corresponding hardware block. At step 340, the packet information can be transferred to a hardware block that corresponds to the next hardware event. Packet information can be transferred to a hardware block using interface circuitry or, more specifically, an output controller. If the next hardware event in the processing sequence is an output event (e.g., the event associated with output hardware block 134), method 300 may end by performing the output hardware event. Otherwise, method 300 may continue to step 350, where steps 310 through 340 can be repeated until a processor task specifies a final hardware event for the packet.

Figure 4:
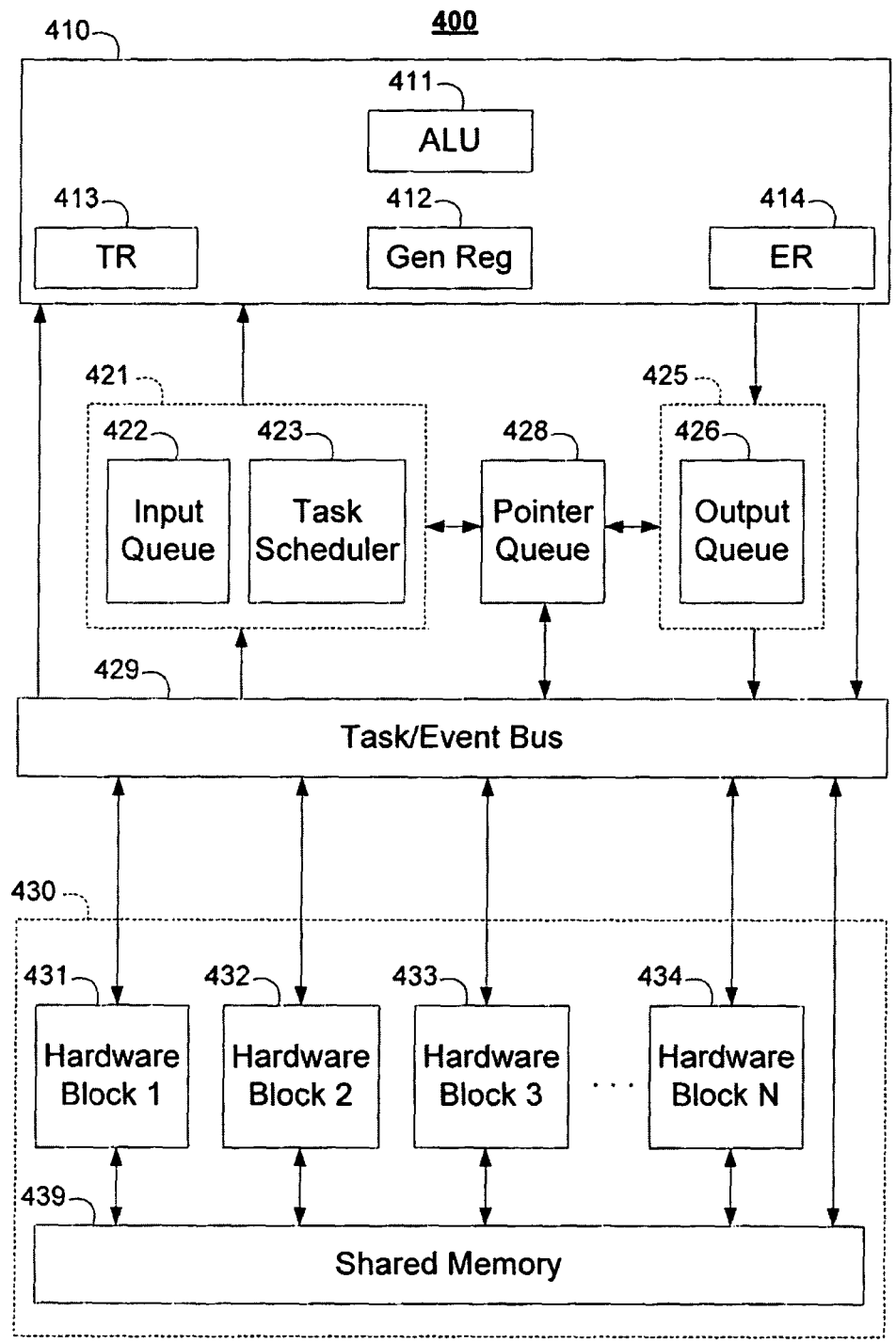
FIG. 4 is a more detailed block diagram of a data processing apparatus in accordance with the present invention.

FIG. 4 shows a block diagram of data processing apparatus 400 in accordance with the present invention. Apparatus 400 can include processor 410, input controller 421, output controller 425, pointer queue 428, task/event bus 429, and hardware blocks 430. Processor 410 can, include an Arithmetic Logic Unit (ALU) 411 for executing instructions. Processor 410 can also include general memory 412 (e.g., registers, cache, RAM, and ROM) for storing the processor's software program and data associated with each of the processor's threads. Processor 410 can also include Task Register 413 and Event Register 414 for facilitating the transfer of packet information into and out of, respectively, processor 410. Task Register 413 and Event Register 414 can function as extra registers for holding data when processor 410 has no idle threads or there are no openings in an output queue.

Input controller 421, output controller 425, pointer queue 428, and task/event bus 429 can be part of the interface circuitry of apparatus 400 (see, e.g., interface circuitry 120 of apparatus 100). Task/event bus 429 can be used to coordinate communications with hardware blocks 430. For example, bus 429 can be used to ensure that only one hardware block tries to communicate with input controller 421 at the same time. Task/event bus 429 can include a task bus that controls transmissions from hardware blocks 430 to input controller 421 and an event bus that controls transmissions from output controller 425 to hardware blocks 430.

The task bus can arbitrate the requests originating from hardware blocks. Each hardware block can have its own interface and an arbitration logic can loop among the blocks. The arbitration logic can designate one hardware block at a time as the "master" block, whereby that block has the ability to transmit data to input controller 421. When transmitting data (e.g., packet information, pointers) over the task bus, typical data bus protocols can be used (e.g., busy, write, address, data, etc.). Once the current "master" block has finished transmitting data, it can release control and the next hardware block can be designated as the "master." If a block does not have any data to transmit, it can release control to the next block. The arbitration logic can continuously monitor requests to transmit data. The order in which the arbitration logic assigns control may follow the order in which hardware blocks are attached to the task bus.

The event bus can transmit data (e.g., packet information, pointers) from output controller 425 to a hardware block. The event bus can include a set of typical data bus signals (e.g., busy, write, address, data, etc.) that are replicated for each hardware block. However, each hardware block can include a separate enable signal that can be activated to transmit data to that block. For example, an event pointer (as discussed above in connection with FIG. 2) can be decoded and used to enable the corresponding hardware block for receiving data.

Input controller 421 can be used to transfer packet information from hardware blocks 430 to processor 410. Input controller 421 can include an input queue 422 (e.g., FIFO memory) and task scheduler 423. Input queue 422 can store sets of pointers, whereby each set of pointers can represent an instance of packet information awaiting an idle processor thread. For each waiting instance of packet information, input queue 422 can store a packet information pointer related to the location of the packet information (e.g., an address in memory 439 or task register 413), a task pointer related to the next processor task in the packet's processing sequence, and any pointers related to order enforcement. Task scheduler 423 can identify when threads become idle and control the transfer of packet information to processor 410. For example, task scheduler 423 can receive the next set of pointers from input queue 422 and instruct processor 410 to load the packet information associated with the packet information pointer and begin executing the task (e.g., one or more software instructions) associated with the task pointer. The operation of input controller 421 is discussed in more detail below in connection with FIG. 5.

Output controller 425 can be used to transfer packet information from processor 410 to hardware blocks 430. Output controller 425 can include an output queue 426 (e.g., FIFO memory) for storing sets of pointers, whereby each set can represent an instance of packet information waiting for a hardware block. The sets of pointers stored in output queue 426 can be substantially similar to those stored in input queue 422, with the exception of event pointers replacing task pointers. Event pointers can be used to identify the next hardware event in the associated packet's processing sequence. The operation of output controller 425 is discussed in more detail below in connection with FIG. 6.

Apparatus 400 can include pointer queue 428 (e.g., FIFO memory). Pointer queue 428 can be used to store pointers in a sequential order. Pointer queue 428 may be configured to store pointers for order enforcement (e.g., packet information pointers and sequence pointers). Pointer queue 428 may be provided with a different queue for each type of pointer, resulting in more than one queue (e.g., a packet information pointer queue and a sequence pointer queue). Pointer queue 428 can be coupled to input controller 421, output controller 425, and task/event bus 429.

In one example, pointer queue 428 may send sequential sequence pointers to input controller 421 such that a sequence pointer can be included in each set of pointers that are added to input queue 422. Once the corresponding instance of packet information has been processed by processor 410 and the set of pointers are in output queue 426 waiting for a hardware block, output controller 425 can use the sequence pointers to reorder the sets of pointers such that their order matches the order in which the sets of pointers were added to input queue 422. This reordering of pointer sets restores the order in which each instance of packet information is sent to hardware blocks such that the order matches the order in which each instance of packet information was sent to a processor. A person of ordinary skill in the art will appreciate that reordering may not involve physically reorganizing the pointer sets. In some embodiments, reordering may involve specifying the order in which pointer sets leave output queue 426. After reordering, sequence pointers can be released from the pointer sets and reinserted sequentially into pointer queue 428.

Additionally or alternatively, pointer queue 428 can provide sequential packet information pointers to an input hardware block. For example, hardware block 431 can be an input block that assigns a packet information pointer to each instance of packet information as it enters apparatus 400. Hardware block 431 can receive these packet information pointers from pointer queue 428 either through task/event bus 429 or through a direct connection (not shown). At the end of the processing sequence, each instance of packet information can be reordered according to the packet information pointers such that the associated data packets are output in the same order as they were input into apparatus 400. Instances of packet information can be reordered in this manner by output controller 425 or output hardware block 434, for example. A person of ordinary skill in the art will appreciate that reordering may not involve physically reorganizing the instances of packet information. In some embodiments, reordering may involve specifying the order in which packet information leaves output controller 425 or output hardware block 434. After reordering, packet information pointers can be released from each instance of packet information and sequentially reinserted into pointer queue 428.

Figure 5:
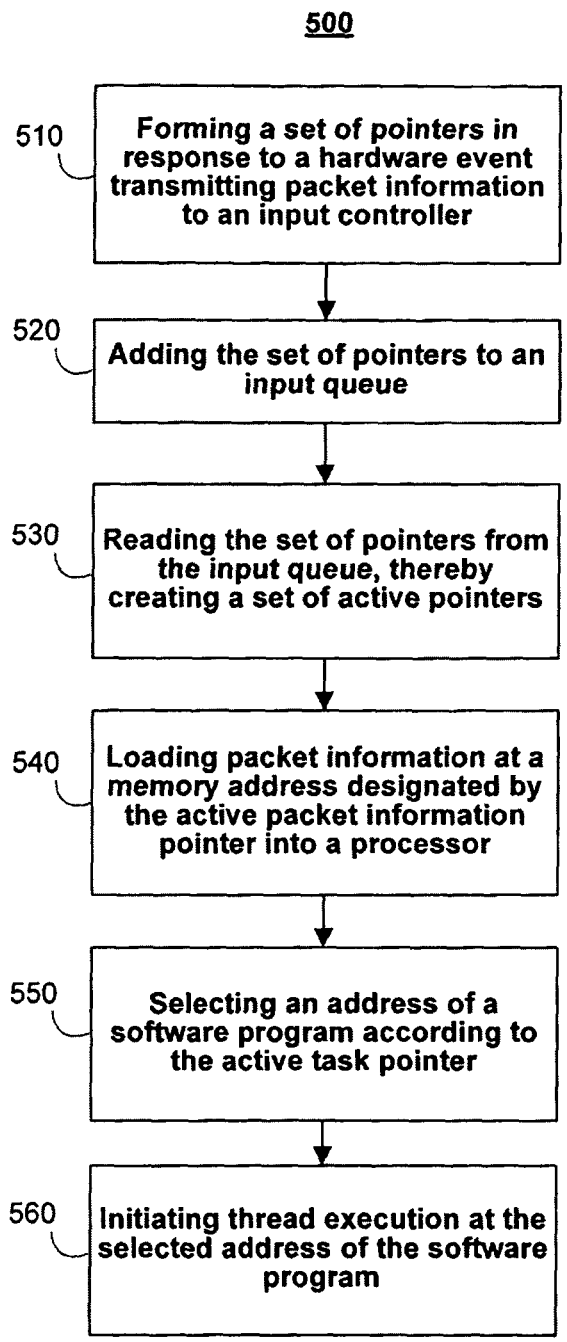
FIG. 5 is a flowchart of a method for transferring packet information to a processor in accordance with the present invention.

FIG. 5 shows a method 500 for transferring packet information to a processor in accordance with the present invention. At step 510, a set of pointers can be formed in response to a hardware event transmitting packet information to an input controller. The pointers used to form the set can originate from various parts of a data processing apparatus. For example, a task pointer can come from the hardware block transmitting packet information and a sequence pointer can come from a pointer queue. Exemplary pointers that can be stored in an input queue in accordance with the present invention are discussed above in connection with FIG. 4. The set of pointers can be formed by, for example, an input controller (e.g., input controller 421). At step 520, the set of pointers can be added to an input queue (e.g., input queue 422). The input queue may be based on a FIFO memory.

At this stage of method 500, other pointer sets may be in front of the pointer set of interest and there may be some delay while the other pointer sets are processed. Method 500 can continue when the pointer set of interest is at the front of the input queue and there is an idle thread in a processor (e.g., multi-threaded processor 410). At step 530, the set of pointers can be read from the front of the input queue, thereby creating a set of active pointers. With respect to method 500, the term "active" refers to the set of pointers that was last read from the input queue and is being transferred to a processor accordingly. At step 540, packet information at a memory address designated by the active packet information pointer can be loaded into the processor with the idle thread. For example, the packet information can be transferred from shared memory 439 in hardware blocks 430 to task register 413 in processor 410. At step 550, an address of a software program can be selected according to the active task pointer. For example, the task pointer can be used to look up a value in a task address table that is preloaded with the information from a processor's program memory. For each possible task pointer, the task address table can store the starting instruction address of the associated task. At step 560, thread execution can be initiated at the selected address of the software program. For example, task scheduler 423 can force the program counter of the idle thread to the starting instruction address for that task.

Figure 6:
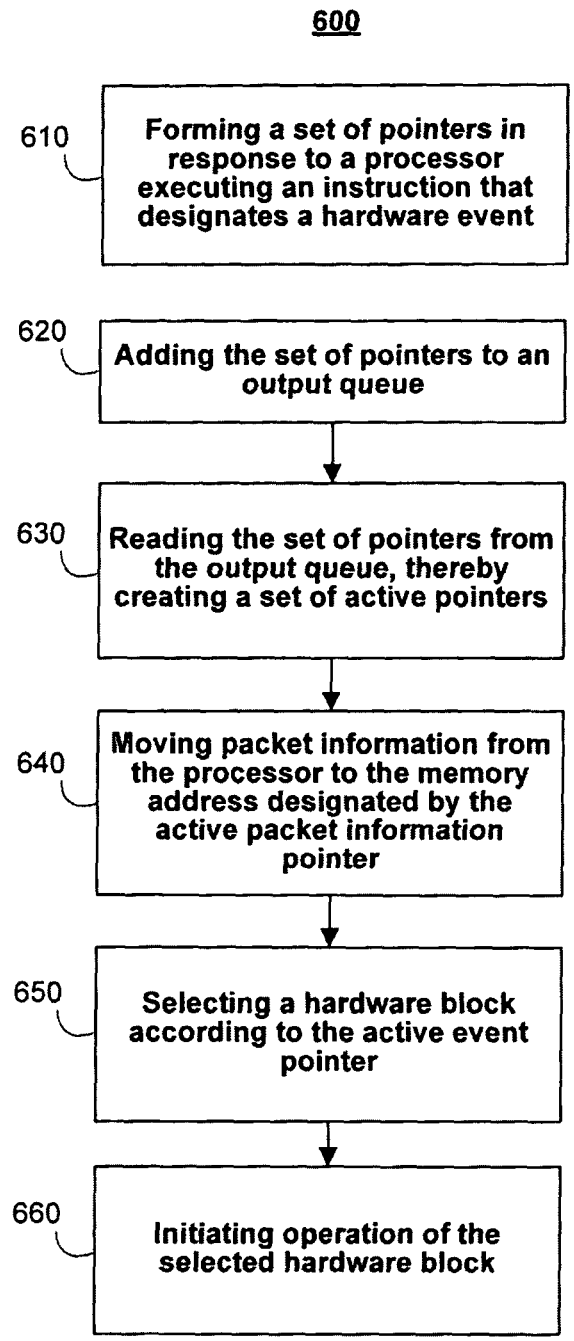
FIG. 6 is a flowchart of a method for transferring packet information to a hardware block in accordance with the present invention.

FIG. 6 shows a method 600 for transferring packet information to a hardware block in accordance with the present invention. At step 610, a set of pointers can be formed in response to a processor (e.g., processor 410) executing an instruction that designates a hardware event. The set of pointers formed in step 610 can be substantially similar to the set of pointers formed in step 510 of method 500. However, instead of a task pointer, an event pointer can be included in the set to indicate the next event in a packet's processing sequence. At step 620, the set of pointers can be added to an output queue (e.g., output queue 426).

At this stage of method 600, other pointer sets may be in front of the pointer set of interest and there may be some delay while those pointer sets are processed. Method 600 can continue when the pointer set of interest is at the front of the output queue. At step 630, a set of pointers can be read from the output queue, thereby creating a set of active pointers. With respect to method 600, the term "active" refers to the set of pointers that was last read from the output queue and is being transferred to a hardware block. Pointer sets can be read from the front of the output queue. Alternatively, pointer sets can be read from the output queue in the order of sequence pointers such that order enforcement is implemented. In such an alternative embodiment, the output queue may be a memory device that can be written out of order, but is read in a specific order (e.g., according to sequence pointers).

At step 640, packet information can be moved from the processor to the memory address designated by the active packet information pointer. For example, packet information can be moved from event register 414 to an address in shared memory 439. At step 650, a hardware block can be selected according to the active event pointer. After a hardware block has been selected, one or more of, the active pointers, other data, and parameters can be sent to the block such that it can configure itself accordingly for the upcoming hardware event. At step 660, the operation of the selected hardware block can be initiated (e.g., through an enable signal).

An optional step (not shown) can be included in between steps 630 and 640 in order to implement order enforcement in accordance with the present invention. In this optional step, pointer sets can be moved from the output queue to an order enforcement queue. The order enforcement queue can be written out of order, but is read in order based on each pointer set's packet information pointer and/or sequence pointer. This optional step and queue can ensure that packet information is sent to hardware blocks in the correct order.

Figure 7:
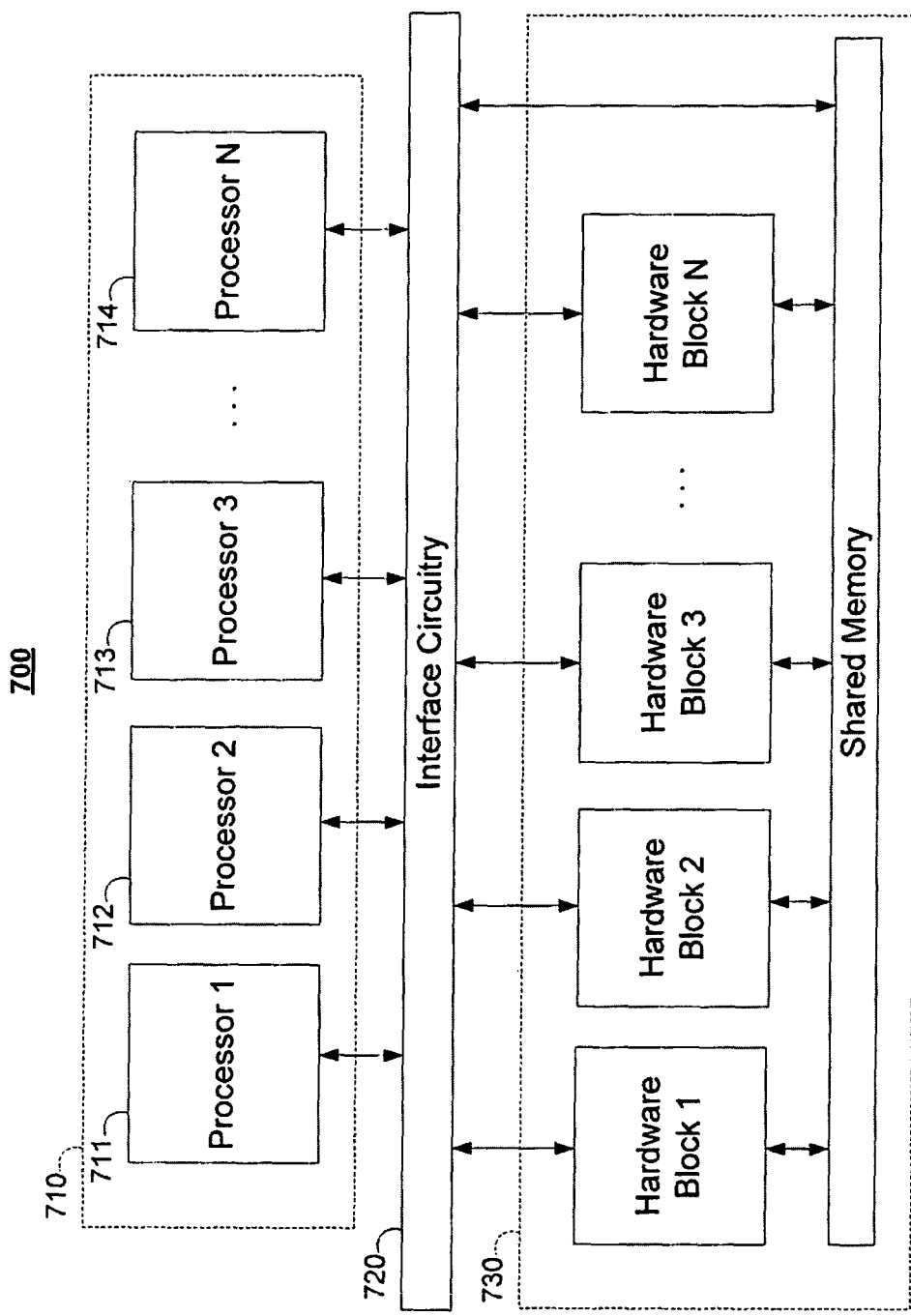
FIG. 7 is a block diagram of a data processing apparatus in accordance with the present invention.

FIG. 7 shows a block diagram of data processing apparatus 700 in accordance with the present invention. Apparatus 700 includes processors 710, interface circuitry 720, and hardware blocks 730. Hardware blocks 730 are substantially similar to hardware blocks 130 of apparatus 100, and, accordingly, the description of hardware blocks 130 can be applied to hardware blocks 730. Interface circuitry 720 can be used to control the transfer of packet information between hardware blocks 730 and processors 710. Processors 710 can include any number of multi-threaded processors 711-714 for performing processor tasks. Each of processors 711-714 can be programmed with the same software program (e.g., software program 200) such that each processor can perform any of the processor tasks. Accordingly, pending processor tasks can be dispatched to the first processor with an idle thread.

Interface circuitry 720 is similar to interface circuitry 120, with some minor changes. For example, interface circuitry 720 can monitor multiple processors when looking for idle threads. Another difference between interface circuitry 720 and interface circuitry 120 is that circuitry 720 can handle situations when more than one processor is outputting data at the same time. For example, processor 711 and processor 713 may both try to output data to interface circuitry 720 at the same time. Therefore, interface circuitry 720 may include a bus or other suitable means for communicating with processors 710. Besides from these differences, interface circuitry 720 is similar to interface circuitry 120. A person having ordinary skill in the art can see that, once interface circuitry 120 is configured, apparatus 100 is easily scalable by increasing the number of processors.

Figure 8:
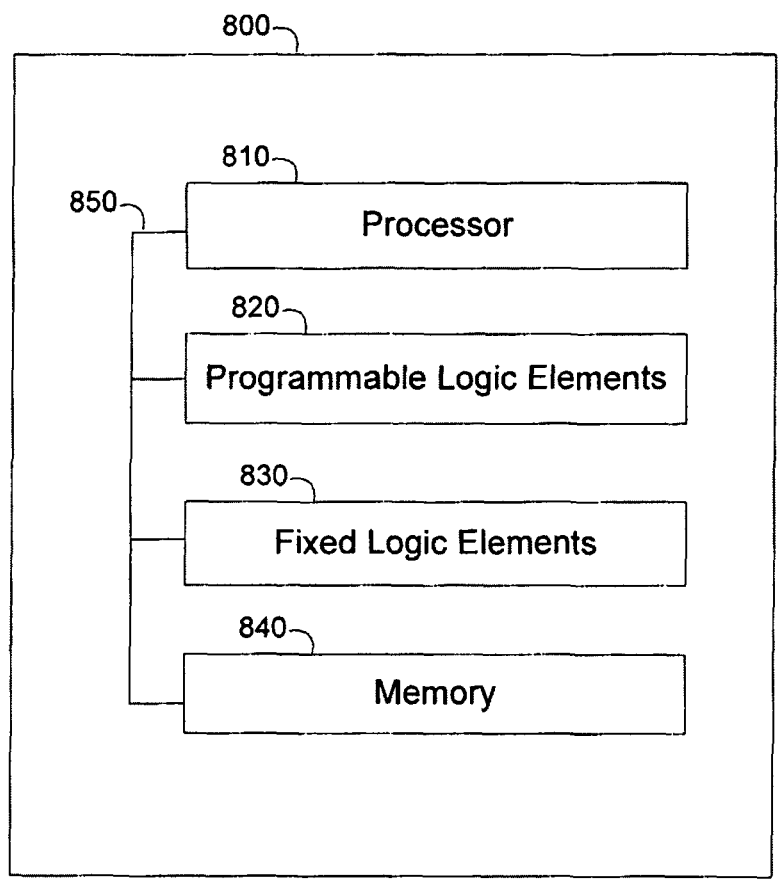
FIG. 8 is a simplified block diagram of a programmable logic device in accordance with the present invention.

FIG. 8 shows PLD 800 in accordance with the present invention. PLD 800 can include processor 810, programmable logic elements 820, fixed logic elements 830, memory 840, and programmable interconnect 850. Processor 810 can be any mechanism capable of executing instructions from an instruction set. In some embodiments, processor 810 may include more than one processor mechanism. Processor 810 may be a multi-threaded processor, for example. Programmable logic elements 820 can be any mechanism in a circuit that performs an operation on a given number of input lines to provide one or more outputs according to how the element is programmed. Programmable logic elements 820 can, for example, be configured using elements such as fuses, antifuses, EPROMS, EEPROMS, or static RAM bits. Fixed logic elements 830 can be any circuitry that performs an operation on input lines to provide one or more outputs. While fixed logic elements may not be programmable, they may be faster than programmable logic elements. Memory 840 can be storage circuitry operable to store data. Programmable interconnect 850 can be of the type typically provided in PLDs. For example, programmable interconnect 850 preferably can be coupled to any of the elements of PLD 800 in a fully programmable manner.

PLD 800 can be configured to implement data processing apparatus and methods in accordance with the present invention. For example, processor 810 can be used to perform processor tasks, programmable logic elements 820 can be configured to provide interface circuitry (e.g., interface circuitry 120), and fixed logic elements 830 can be organized into individual hardware blocks (e.g. hardware blocks 130). Fixed logic elements 830 may be organized into a predetermined set of hardware blocks, each of which may be capable of performing a predetermined hardware event. In some embodiments, there may be more than one block capable of performing the same event (e.g., especially if that event is common in processing sequences).

When configuring PLD 800 to perform a processing sequence, programmable interconnect 850 can be programmed such that any hardware blocks necessary for that sequence (e.g., those corresponding to events that are in the sequence) are connected to the correct programmable logic elements 820. Fixed logic elements 830 may include hardware blocks that are not used in a particular user design implemented in PLD 800. In such a case, those unused blocks may not be connected by interconnect 850 to programmable logic elements 820.

Additionally, when configuring PLD 800 to perform a processing sequence, programmable logic elements 820 can be programmed such that the programmable logic elements 820 provide appropriate interface circuitry for the sequence. For example, if a sequence does not call for order enforcement, programmable logic elements 820 may be programmed such that the programmable logic elements 820 provide interface circuitry without that feature. In addition to programming logic elements 820 and interconnect 850, PLD 800 can load the software program associated with the processing sequence into processor 810.

Figure 9:
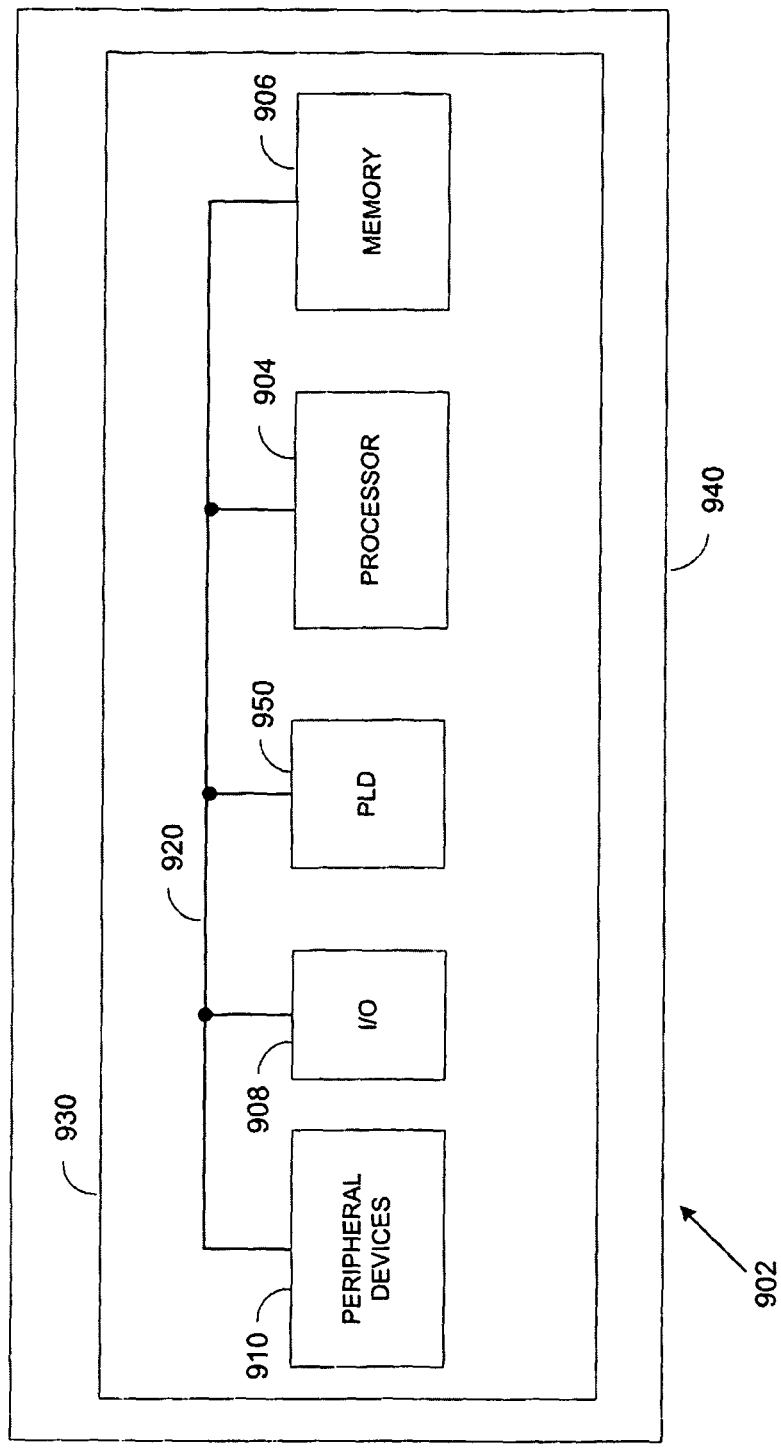
FIG. 9 is a simplified block diagram of an illustrative system employing a data processing apparatus in accordance with the present invention.

FIG. 9 illustrates a PLD or other circuitry 900 in a data processing system 902 that may incorporate apparatus and methods in accordance with the invention. Data processing system 902 may include one or more of the following components: a processor 904; memory 906; I/O circuitry 908; and peripheral devices 910. These components are coupled together by a system bus or other interconnections 920 and are populated on a circuit board 930 (e.g., a printed circuit board), which is contained in an end-user system 940. Any of the physical interconnections between PLD circuitry 950 and any other elements may be made in a manner known to one skilled in the art.

System 902 can be used in a wide variety of applications, such as computer networking, data networking, instrumentation, video processing, digital signal processing, or any other application where the advantage of using programmable or reprogrammable logic is desirable. PLD circuitry 950 may, for example, be used to perform a variety of different logic functions. For example, circuitry 950 can be configured as a processor or controller that works in cooperation with processor 904. Circuitry 950 may also be used as an arbiter for arbitrating access to a shared resource in system 902 (e.g., shared memory). In yet another example, circuitry 950 can be configured as an interface (e.g., interface circuitry) between processor 904 and one of the other components in system 902. It should be noted that system 902 is only exemplary, and that the true scope and spirit of the invention should be indicated by the following claims.

It will be understood that the foregoing is only illustrative of the principles of the invention, and that various modifications can be made by those skilled in the art without departing from the scope and spirit of the invention, and the present invention is limited only by the claims that follow.

What is claimed is:

1. Apparatus for processing a plurality of successive data packets, the apparatus comprising:
   at least one multi-threaded processor that is operable to perform processor tasks;
   a plurality of hardware blocks each of which is dedicated to perform a hardware event; and
   interface circuitry that is operable to control the transfer of packet information associated with each of the plurality of successive data packets between the at least one multi-threaded processor and the plurality of hardware blocks, the interface circuitry comprising:
   an input controller having:
   an input queue operable to store pointers associated with packet information waiting to be transferred to the at least one multi-threaded processor, and
   a task scheduler operable to identify idle threads in any of the at least one multi-threaded processor and load an instance of packet information into the idle thread based on the next pointer in the input queue; and
   an output controller having an output queue operable to store pointers associated with packet information waiting to be transferred to one of the plurality of hardware blocks.

2. The apparatus of claim 1, wherein the at least one multi-threaded processor comprises:
   a task register that is operable to store packet information associated with pending processor tasks; and
   an event register that is operable to store packet information associated with completed processor tasks.

3. The apparatus of claim 1, wherein the output controller is further operable to transfer instances of packet information to one of the plurality of hardware blocks in the same order as the pointers associated with each instance of packet information entered the input queue.

4. The apparatus of claim 3, further comprising a sequence pointer queue operable to store unused sequence pointers; wherein:
   the input controller is operable to remove sequence pointers from the sequence pointer queue and assign sequence pointers to packet information; and
   the output controller is operable to release sequence pointers from packet information and add sequence pointers to the sequence pointer queue.

5. The apparatus of claim 1, wherein:
   the plurality of successive data packets is originally provided to the apparatus in an order; and
   the apparatus is operable to finish processing the plurality of successive data packets in the same order.

6. Apparatus for processing a plurality of successive data packets, the apparatus comprising:
   at least one multi-threaded processor that is operable to perform processor tasks;
   a plurality of hardware blocks each of which is dedicated to perform a hardware event;
   interface circuitry that is operable to control the transfer of packet information associated with each of the plurality of successive data packets between the at least one multi-threaded processor and the plurality of hardware blocks; and
   a packet information pointer queue operable to store unused packet information pointers; wherein:
   a first of the plurality of hardware blocks is operable to remove packet information pointers from the packet information pointer queue and assign packet information pointers to packet information; and
   a last of the plurality of hardware blocks is operable to release packet information pointers from packet information and add packet information pointers to the packet information pointer queue.

7. The apparatus of claim 1, wherein the plurality of hardware blocks comprises shared memory that is electrically coupled to each of the plurality of hardware blocks.

8. The apparatus of claim 1, wherein at least one of the plurality of hardware blocks is configurable.

9. The apparatus of claim 8, wherein the at least one multi-threaded processor is operable to configure at least one of the plurality of hardware blocks based on a processor task.

10. Apparatus for processing a plurality of successive data packets, the apparatus comprising:
   at least one multi-threaded processor that is operable to perform processor tasks;
   a plurality of hardware blocks each of which is dedicated to perform a hardware event; and
   interface circuitry that is operable to control the transfer of packet information associated with each of the plurality of successive data packets between the at least one multi-threaded processor and the plurality of hardware blocks; wherein:
   the at least one multi-threaded processor operates at a first clock frequency;
   the plurality of hardware blocks operate at a second clock frequency different from the first clock frequency;
   a first portion of the interface circuitry operates at the first clock frequency; and
   a second portion of the interface circuitry operates at the second clock frequency.

11. A programmable logic device comprising apparatus as defined in claim 1.

12. The programmable logic device of claim 11, wherein the interface circuitry is configured from programmable logic of the programmable logic device.

13. A digital processing system comprising:
   processing circuitry;
   a memory coupled to said processing circuitry; and
   a programmable logic device as defined in claim 12 coupled to the processing circuitry and the memory.

14. A printed circuit board on which is mounted a programmable logic device as defined in claim 11.

15. The printed circuit board defined in claim 14, further comprising:
   memory circuitry mounted on the printed circuit board and coupled to the programmable logic device.

16. The printed circuit board defined in claim 15, further comprising:
   processing circuitry mounted on the printed circuit board and coupled to the memory circuitry.

17. A method for processing a data packet, the method comprising:
   performing a hardware event on packet information associated with the data packet;
   transferring the packet information to a multi-threaded processor;
   performing a processor task on the packet information that specifies a next hardware event;
   transferring the packet information to a dedicated hardware block that corresponds with the next hardware event; and
   repeating the performing a hardware event, transferring to a processor, performing a processor task, and transferring to a dedicated hardware block until a processor task specifies a final hardware event for the data packet; wherein:
   the performing a processor task occurs at a first clock frequency;
   the performing a hardware event occurs at a second clock frequency different from the first clock frequency; and
   each of the transferring the packet information to a multi-threaded processor, and the transferring the packet information to a dedicated hardware block, comprises transferring the packet information through an interface that operates at both the first clock frequency and the second clock frequency.

18. A method for processing a plurality of data packets, the method comprising:
   initiating a processing method as defined in claim 17 for a first data packet; and
   initiating a processing method as defined in claim 17 for a second data packet, wherein the processing of the second data packet is initiated before the processing of the first data packet is finished.

19. The method of claim 18, wherein the transferring packet information associated with the second data packet to a hardware block is delayed until the transferring packet information associated with the first data packet to a hardware block has occurred.

20. The method of claim 18, wherein the completion of the processing of the second data packet is delayed until the processing of the first data packet is finished.

21. The method of claim 20 further comprising configuring the dedicated hardware block with parameters for the next hardware event.

22. A programmable logic device comprising apparatus as defined in claim 10.

23. The programmable logic device of claim 22, wherein the interface circuitry is configured from programmable logic of the programmable logic device.

24. A digital processing system comprising:
   processing circuitry;
   a memory coupled to said processing circuitry; and
   a programmable logic device as defined in claim 23 coupled to the processing circuitry and the memory.

25. A printed circuit board on which is mounted a programmable logic device as defined in claim 22.

26. The printed circuit board defined in claim 25, further comprising:
   memory circuitry mounted on the printed circuit board and coupled to the programmable logic device.

27. The printed circuit board defined in claim 26, further comprising:
   processing circuitry mounted on the printed circuit board and coupled to the memory circuitry.

28. A programmable logic device comprising apparatus as defined in claim 6.

29. The programmable logic device of claim 28, wherein the interface circuitry is configured from programmable logic of the programmable logic device.

30. A digital processing system comprising:
   processing circuitry;
   a memory coupled to said processing circuitry; and
   a programmable logic device as defined in claim 29 coupled to the processing circuitry and the memory.

31. A printed circuit board on which is mounted a programmable logic device as defined in claim 28.

32. The printed circuit board defined in claim 31, further comprising:
   memory circuitry mounted on the printed circuit board and coupled to the programmable logic device.

33. The printed circuit board defined in claim 32, further comprising:
   processing circuitry mounted on the printed circuit board and coupled to the memory circuitry.

* * * * *